Oct. 20, 1953  C. E. ROESSLER, JR  2,656,520
MOTION TRANSMITTER
Filed May 31, 1951
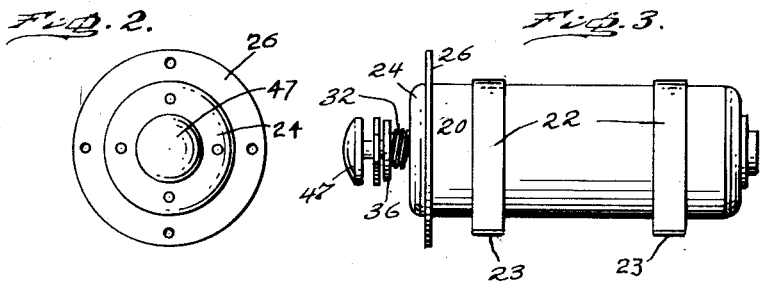
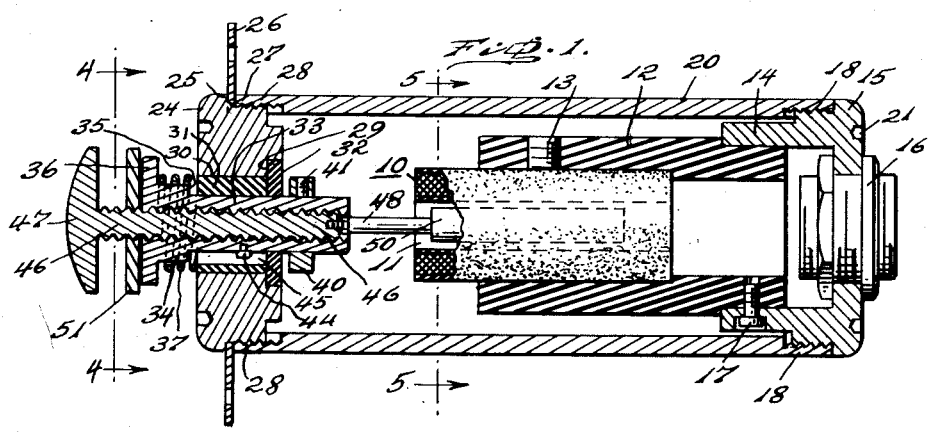
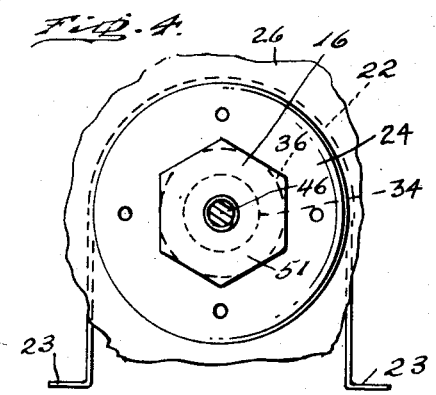
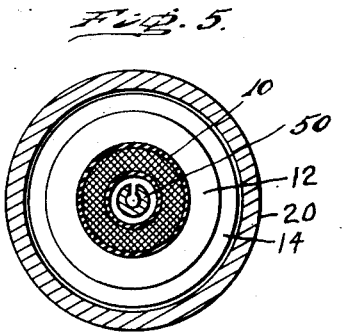
INVENTOR
Charles E. Roessler, Jr.
BY
Frank H. Borden
ATTORNEY.

Patented Oct. 20, 1953

2,656,520

UNITED STATES PATENT OFFICE 2,656,520

MOTION TRANSMITTER

Charles E. Roessler, Jr., Philadelphia, Pa., assignor to Automatic Temperature Control Co., Inc., Philadelphia, Pa., a corporation of Pennsylvania Application May 31, 1951, Serial No. 229,171

3 Claims. (Cl. 336—65)

This invention relates to motion transmitters.

In the field of instrumentation, as of the telemetering types, for instance, there has been developed the use of differential transformers. These transformers have a stator comprising hollow air-cored coils having primary and secondary windings, and an armature of magnetizable material axially adjustable in the stator. One of the windings is in bucking relation so that the output of the secondaries is substantially null in a generally centered relative disposition of the armature and stator, progressing to an output of one phase and of linearly increasing amplitude with departure of the components from null in one sense, and progressing to an output of an opposite phase and of linearly increasing amplitude with departure of the components from null in the opposite sense. In the preferred embodiment the curve of amplitude from null is linear to a given maximum amplitude, with very small relative motions of the armature. While a transformer as shown in the patent to Macgeorge, No. 2,427,866, may be used, in which the order of relative motion of armature and stator in its complete range of linear output may be 0.1", for purposes of this invention it is preferred to use the differential transformer shown and claimed in the Macgeorge application Serial Number 61,835, now matured into Patent No. 2,568,587, of September 18, 1951, in which the order of relative motion of the parts with a complete range of linear outputs may be 0.3". In this latter case the stator comprises two axially aligned airspaced hollow coils, each formed of at least two wires laid on in adjacency in identical multiple turns in each coil, with interconnections between the wires to establish wires of both coils as a primary, and with other interconnections between wires to establish wires of both coils of a secondary in one of which interconnections there is established bucking relation so that the output of the secondaries is as a resultant of bucking voltages. This is simple, stable, and highly efficient, and has a longer linear portion of the output curve than any other differential transformer presently known.

In using such transformers they are frequently used in pairs, one of which, comprising a transmitter, has its armature movement controlled by changes in variable conditions, such as heat, pressure fluid flow, fluid level and the like, in which the variable affects bellows, Bourdon tubes, thermostats, or the like. The output of this transmitter bucks the output of another differential transformer (receiver), the armature movement of which is controlled by a servo mechanism caused to run in proportion to unbalance between the transformers and in the proper sense to restore balance between the outputs when the servo stops. The servo may also actuate other devices such as indicators or recorders or the like. On the other hand, as a signal device with a variable A. C. output, in moving the transformer armature from the null output relative position to the coils, the differential transformers have utility, regardless of whether the signal so produced is balanced, or regardless of the circuit in which the transformer is located, as regards its make-up and functioning.

In the course of solution of the problems of instrumentation with such differential transformers as have been described, many situations arise in which the attachment of the armature to the condition-responsive device involves difficulties which have previously interfered with the wider uses of the devices. It is relatively simple to attach the armature directly to a device having a small motion, such as a bellows or Bourdon tube or the like, which have movable elements with small strokes, so that when directly coupled to the armature to move same through a motion of the order of and as small as 0.3", this is adequate to secure the entire linear range of transformer outputs, in moving from an output of maximum amplitude of one phase through null to an output of maximum amplitude of the opposite phase. When the associated condition-responsive element has a longer stroke than this, and the element is directly coupled to the armature of such transformer, the actuation thereof beyond the small order of movement just mentioned progressively moves the armature out of the linear range of the transformer, and may even move it completely out of the stator coils, so that a secondary generally null output occurs from the transformer. As these air cored differential transformers are delicate units functioning with minute changes in inductances, it will be understood that as normally used they must be isolated from contiguous masses of magnetizable material, such as in machinery and the like, and must also be so placed as to be out of the way of splashing oil and the like.

For moving machinery parts it is desirable to measure or to provide a device which responds to all or even a portion of the total stroke of movement of a selected element of a machine with a desired output of the transformer with accuracy regardless of the fixed or moving masses of metal in the apparatus. Owing to the inaccuracies such masses cause, this has not previously been possible, so far as known.

While this selected portion of a machinery stroke may feed a signal into a telemetering system for rebalance by other means in the circuit in which it is placed, within the purview of this invention, the primary objective of the invention is to provide an assembly which is unaffected by adjacent masses of metal, and is immune to oil splashes, by which a signal can be produced by a movable element contacting, but not connected to, the assembly, whereby the traversing of the movable element through a predetermined portion of its stroke creates or establishes or modifies a signal of that fact. In this connection, in its broadest aspects the invention comprises a shielded form of limit switch or signal per se. It is particularly valuable for gauging or for automatically controlling gauging for the operation of relays for various purposes, or for actuating indications, counters, signals, and recorders.

It is among the further objects of this invention to provide an assembly of a movable element transformer with a variably set actuating device by which motion of one part effects a change of signal of the output of the transformer, with means subject to impact to create said signal change; to provide as an article of manufacture a shielded housing with means for mounting same and with a motion-responsive element for disposition in the path of a moving device and with transformer elements arranged for the development of a signal when the moving device contacts the motion-responsive device; to provide a differential transformer unit in an organization with an impact member coupled adjustably to the movable element of the differential transformer, with means for setting and adjusting the movable portion of the differential transformer relative to the relatively stationary complemental transformer member and coupled to the impact member to establish a normal output from the transformer in a normal setting of the impact member, and responsive to motion of the complemental member for developing a changed signal or a null signal in response to the motion of the impact member; to provide a differential transformer completely shielded against stray inductive effects; to provide a housed differential transformer unit which is immune to adverse effects from oil drippings or splashings.

Other objects and advantages will become more apparent as the description proceeds.

In the accompanying drawings forming part of this description:

Fig. 1 represents a longitudinal vertical section through the device according to an illustrative form thereof;

Fig. 2 represents an end elevation thereof;

Fig. 3 represents a side elevation thereof;

Fig. 4 represents transverse vertical section taken on line 4—4 of Fig. 1;

Fig. 5 represents a transverse vertical section taken on the line 5—5 of Fig. 1.

Whatever the particular coil arrangements of the differential transformer, in essence it comprises an open-ended hollow tubular stator member 10, comprising primary and secondary windings in an air-cored coil arrangement, and having the axial through bore 11. The tubular stator member 10 is mounted in an insulating support 12, such as of "Bakelite," within which it is preferably axially fixed and is held in a set position by some such means as the non-magnetizable set screw 13. The support 12 is mounted in the inwardly projecting sleeve member 14 of a shouldered rear end fitting 15 of non-magnetic material, mounting a female terminal member 16, to which the various primary and secondary leads for the transformer coil unit are connected. The terminal member 16 is preferably such as to provide a quick-detachable fitting for and with a male terminal member (not shown) by apertures in the face of the fitting 16. The support 12 has a push fit by means of a reduced end, fitting in and stopping against the end of the sleeve extension 14 of the rear end fitting. The sleeve extension 14 and the support 12 are anchored together by some such means as the non-magnetic set-screw 17. The end fitting 15 has a reduced portion 18, externally threaded for tight threaded engagement with the external tubular cylindrical metal shield 20, of magnetizable material, forming the outer member of the assembly. For this purpose, the end fitting 15 may incorporate spanner openings 21. If desired, clamping members 22 may be mounted to encircle the housing 20, with mounting feet 23 extending generally tangentially thereof, where the mounting plate to be described may not be suitable for mounting the unit, or in addition to such plate or plates.

A front end fitting 24 of non-magnetic material is provided, having the rearwardly presenting flange surface 25 for abutting engagement with a mounting plate 26. The mounting plate is preferably annular and has a central aperture 27, having slidable clearance over the reduced threaded shank portion 28 of the front end fitting, threadably engaged internally with the front end of the shielding cylindrical housing 20, clamping the mounting plate 26 between the front end of the shielding housing 20 and the flange surface 25. The mounting plate 26 may be mounted at the front end as shown, or at the rear end for clamping engagement between the housing 20 and rear end fitting 15, or two such plates may be provided, respectively at opposite ends of the housing.

The front end fitting 24 has an axial aperture or bore 30, within which is fitted the internally slotted insulating oil-sealing bushing 31, internally abutting the grease-retaining, oil-sealing insulating disc 32, fitted in a suitable recess 29 in the rear face of the front end fitting 24. Slidably mounted and guided in the bushing 31 is the movable composite structure of the assembly, comprised of the open-ended internally bored and threaded sleeve 33, having the enlarged forward portion 34, forming the rearwardly presenting shoulder 35, for abutment against the front end of the bushing 30, and terminating forwardly of the enlargement 34 in the integral terminal flange 36. A compression spring 37 engages between the front end of the bushing 30, and the rear face of the flange 36, for normally biasing the sleeve 33 forwardly, limited and stopped by the stop ring 40, adjustably positioned and set on the threaded sleeve 33, as by means of the set screw 41. The stop ring 40 moving with the biased sleeve 33 under the bias abuts the disc 32. The sleeve 33 is held against rotation in the assembly by a pin 44 slidable in an axial slot 45 internally formed in bushing 33.

An externally threaded shank or stem 46 having the enlarged terminal impact or abutment head 47, is threaded into the internally threaded sleeve 33, and at its rear end, internally of the assembly, by a connection 48, mounts the armature 50, of the transformer. A lock nut 51 is threaded on the externally threaded shank 46 and is of such diameter as to project radially beyond flange 36 so as to be readily moved manually by an operator, and disposed for jamming against the forward face of the flange 36, to lock the shank 46 against rotation relative to the threaded sleeve 33.

While for clarity the parts are shown in Fig. 1 in a generally mid-position, or instantaneously in a return to the based forward position, it will be understood that in the normal condition thereof the movable portion of the assembly, comprising the sub-unit formed of sleeve 33, the threaded shank 46, the connector 48, and the armature 50, together with the forwardly disposed interlocked portions comprised of the enlargement 34, flange 36, lock nut 51, and the impact head 47, will be disposed in a position determined by the setting of the locking ring 40 on the sleeve 33. In this forwardly biased position, as noted, the locking ring abuts and is stopped against the disc 32. It will be seen further that the degree of motion available to the armature 50 is determined by the variable clearance between the locking ring forward face, and the rearward face of the shoulder 35, on the enlargement of the threaded sleeve.

It will be understood that all metal parts shown, other than the magnetizable shield housing 20 and armature 50, including both end fittings, all set screws, the movable sub-unit, including the locking ring, and the mounting plates and clamps, will be formed of non-magnetizable metal, such as non-magnetic stainless steel.

While it will be clear that the range of permissible motion with the organization disclosed and the settings of the components of the differential transformer may be such that in the normal biased position the transformer has a constant output of A. C. of given phase and of amplitude proportional to the selected settings of the armature and stator within the linear range of the transformer, so that a complete motion under impact or force against the impact head continued until the shoulder 35 abuts insulating bushing 30 and stops the moving sub-unit, may cause the output of the transformer to successively decrease toward null, pass through a null output, and progress to an output of predetermined amplitude of opposite phase, this is not the preferred settings of the device.

It is preferred that the normally biased outward position of the movable portion of the unit is either with the armature so disposed in the stator coils that the output is substantially null, so that the motion of the armature changes the output from null linearly to a given amplitude of given phase, as the developed signal of the extreme motion of the movable sub-unit, or that the normal setting is with a given output decreasing to null at the end of the inward motion of the armature.

In operation, the clearances between the shoulder 35 and locking ring 40 are fixed to accord with the degree of motion required for the desired amplitude of signal. The shielded assembly is mounted at a suitable point on a machine, for instance. With the stator fixed and the plug-in device coupled to the end fitting and the coils energized, the lock nut 51 is manually backed off or loosened, and the threaded shank 46, using impact head 47 as a handle for instance, is turned slowly until the armature is properly positioned in the stator, without inward motion of the sleeve 33, so as to produce a substantially null output from the secondary coils. Then the lock nut is tightened and jammed against the flange 36, anchoring the stem or shank 46 against axial or angular motion. If the impact head is so disposed as to be contacted by a moving part at a limit of its motion, or periodically with rotary motion thereof, the force applied to the impact head thereby moves the armature to its predetermined limit and an A. C. signal of predetermined amplitude is developed, and conversely, if the normal signal is to be decreased to null at the end of the inward motion of the sub-unit. The sub-unit is pushed inwardly and the threaded stem or shank adjusted so as to establish the substantially null output. Then the lock nut is tightened and when the movable unit is released the outward biased motion of the sub-unit moves the armature from the null setting toward an output of given phase and amplitude. As noted, this signal has value of itself, may operate a relay, so as to reverse the machine, for instance, or may set in train other actions, recorders, indicators, or the like. In this respect the element may constitute a counter of the number of impacts received. Other uses will occur to those skilled in the art, as will modifications and alternative forms which do not depart from the spirit of the invention.

It will be understood that the cylindrical shielding housing extending axially well beyond the ends of the stator coil unit, has a constant affect upon the inductances in the transformer while shielding the unit from stray inductances as from either moving or stationary masses or magnetizable metal in the machine with which the device is associated. The disposition of the movable sub-unit in the insulating oil-sealing bushing backed up by the oil-sealing disc washer effectively prevents creepage or seepage of oil or grease into the housing.

The simplicity and efficiency of the unit will be appreciated.

Having thus described my invention, I claim:

1. A differential transformer assembly comprising an end fitting having an axial bore, an internally threaded sleeve slidable in the bore, an externally threaded shank threaded into and adjustable axially of the sleeve by relative rotations thereof, an armature, means mounting the armature on the threaded shank, a stator unit having an aperture, and means mounting the stator unit in substantially concentric relation to the armature enclosing said armature in relatively fixed relation to said end fitting, plural stop means on the threaded sleeve limiting the motion thereon axially in both directions, and means biasing said sleeve toward one stop means and means selectively operable to lock or unlock the shank and sleeve together.

2. As an article of manufacture, an end fitting having an axial bore, an oil-sealing bushing in the bore, an oil-sealing disc mounted on the fitting and having an aperture registering with that of the bushing, an internally threaded sleeve extending through and slidably guided in the bushing and disc, stop means on the sleeve on one side of said fitting to limit its motion in one direction relative to the fitting, adjustable stop means on the other side of said fitting for limiting its motion relative to the fitting in the other direction, a threaded shank mounted in the sleeve, adjustable means for limiting rotation of the shank in the sleeve to set the shank in an axially adjusted position relative to the sleeve, spring means operative between the sleeve and the fitting to bias the sleeve against one of said stop means, a cylindrical tube of magnetizable material mounted rigidly on the end fitting, a second end fitting mounted rigidly on said tube, a support mounted on said second fitting internally of the tube, a two-part movable element transformer, one part of said two-part movable element transformer mounted on the support, the other part of said two-part transformer mounted on said threaded shank in inductive relation to said one part, whereby axial thrust on the shank moves the other said part to vary the output of said transformer and moves said shank against the bias toward said other stop.

3. In motion transmitters, a housing formed of a first and a second end fitting and a ferrous tube connected tightly together, a two-part movable element transformer, means for mounting one part of the transformer on one end fitting internally of said ferrous tube, a slidable element mounted in the other end fitting, means mounting the other part of said transformer on the slidable element for inductive relation to the said one part, means biasing the slidable element in one direction, and means for limiting the movement of the slidable element in both directions.

CHARLES E. ROESSLER, Jr.

References Cited in the file of this patent

UNITED STATES PATENTS

| Number | Name | Date |
| --- | --- | --- |
| 2,417,097 | Warshaw | Mar. 11, 1947 |
| 2,427,866 | Macgeorge | Sept. 23, 1947 |
| 2,461,238 | Schawitz | Feb. 8, 1949 |
| 2,564,221 | Hornfeck | Aug. 14, 1951 |